US006970946B2

(12) United States Patent
Ueoka et al.

(10) Patent No.: US 6,970,946 B2
(45) Date of Patent: Nov. 29, 2005

(54) SYSTEM MANAGEMENT INFORMATION PROCESSING METHOD FOR USE WITH A PLURALITY OF OPERATING SYSTEMS HAVING DIFFERENT MESSAGE FORMATS

(75) Inventors: Atsushi Ueoka, Fujisawa (JP); Tsutomu Ito, Shiroyama (JP); Manabu Demoto, Sagamihara (JP); Tadashi Yamagishi, Kawasaki (JP); Hiroshi Wada, Yokohama (JP); Takashi Matsumoto, Yokohama (JP); Takashi Nomura, Atsugi (JP)

(73) Assignees: Hitachi, Ltd., Tokyo (JP); Hitachi Software Engineering Co., Ltd., Yokohama (JP); Hitachi Electronics Services Co. Ltd., Tokyo (JP)

( * ) Notice: Subject to any disclaimer, the term of this patent is extended or adjusted under 35 U.S.C. 154(b) by 749 days.

(21) Appl. No.: 09/883,967

(22) Filed: Jun. 20, 2001

(65) Prior Publication Data

US 2002/0002634 A1    Jan. 3, 2002

(30) Foreign Application Priority Data

Jun. 28, 2000    (JP)    ............................. 2000-200067

(51) Int. Cl.[7] ............................................ G06F 13/00
(52) U.S. Cl. ...................... 709/246; 709/206; 704/2

(58) Field of Search ............................... 709/217, 219, 709/206, 246; 719/328, 329; 715/513; 704/2, 704/3, 4, 7, 8

(56) References Cited

U.S. PATENT DOCUMENTS

| | | | | |
|---|---|---|---|---|
| 5,946,376 A * | 8/1999 | Cistulli | .................... | 379/88.06 |
| 6,119,079 A * | 9/2000 | Wang et al. | .................... | 704/8 |
| 6,363,337 B1 * | 3/2002 | Amith | .................... | 704/7 |
| 6,691,279 B2 * | 2/2004 | Yoden et al. | ............. | 715/501.1 |
| 6,802,059 B1 * | 10/2004 | Lyapustina et al. | .......... | 717/143 |
| 2002/0021307 A1 * | 2/2002 | Glenn et al. | ................. | 345/753 |

FOREIGN PATENT DOCUMENTS

JP    5-308415    5/1992

OTHER PUBLICATIONS (Hewlett Packard Company), Managing Your Network with HP OpenView Network Node Manager, Chapter 11, Jan. 2000, pp 5-18 and 359-412.

* cited by examiner

Primary Examiner—Viet D. Vu
(74) Attorney, Agent, or Firm—Reed Smith LLP; Stanley P. Fisher, Esq.; Juan Carlos A. Marquez, Esq.

(57) ABSTRACT

A controller connected to computers analyzes messages from the computers and converts the analyzed messages into a different format. The controller also generates correspondence information for the message.

13 Claims, 9 Drawing Sheets

| SELECTION CONDITION | SETTING INFORMATION | |
|---|---|---|
| WORD3=JSF621D<br>WORD4=M<br>WORD5=VOLUME | MSG=PLEASE MOUNT THE TAPE OF INITIALIZE IS TREATED<br>      VOLUME[&WORD9&] ON DEVICE[&WORD11&]<br>DEVICE NAME=&WORD11&<br>JOB NUMBER=&WORD1&<br>STATUS= DEMAND TO MOUNT THE TAPE TO INITIALIZE | ~30a |
| WORD2=JDJ451I | MSG=STEP [&WORD4&] OF JOB [&WORD3&] IS<br>      ABNORMAL END<br>JOB NAME=&WORD3&<br>JOB NUMBER=&WORD1&<br>STATUS=JOB IS ABNORMAL END | ~30b |
| IMPORTANCE=A | MSG=MESSAGE OF IMPORTANCE A OCCURRED | ~30c |
| ⋮ | ⋮ | |

| SELECTION CONDITION | SETTING INFORMATION |
|---|---|
| WORD3=JSF621D<br>WORD4=M<br>WORD5=VOLUME | MSG = WHEN YOU INITIALIZE AS VOLUME[&WORD9&],PLEASE MOUNT THE TAPE ON DEVICE[&WORD11&] AND PUSH OK BUTTON<br>PLEASE PUSH A CANCEL BUTTON, WHEN YOU DO NOT INITIALIZE<br>OK=R &WORD2& M<br>CANCEL=R &WORD2& S |
| . . . | . . . |

61 — SELECTION CONDITION
60 — SETTING INFORMATION
62
60a

FIG. 6

THE MESSAGE DIVIDED PER WORD

| WORD1 | WORD2 | WORD3 | WORD4 | WORD5 | WORD6 |
|---|---|---|---|---|---|
| J123 | 57 | JSF621D | M | VOLUME | TO |

| WORD7 | WORD8 | WORD9 | WORD10 | WORD11 |
|---|---|---|---|---|
| BE | LABELD | AAA | ON | T01 |

~41

CORRE-
SPONDENCE
INFORMATION
FILE  ~20

① SELECT THE RECORD WHOSE VALUE OF WORD OF
SELECTION CONDITION AND MESSAGE CORRESPOND 61          60a          62

| SELECTION CONDITION | SETTING INFORMATION |
|---|---|
| WORD3=JSF621D<br>WORD4=M<br>WORD5=VOLUME | MSG = WHEN YOU INITIALIZE AS VOLUME[&WORD9&],PLEASE<br>MOUNT THE TAPE ON DEVICE[&WORD11&] AND PUSH OK<br>BUTTON<br>PLEASE PUSH A CANCEL BUTTON, WHEN YOU DO NOT<br>INITIALIZE<br>OK=R &WORD2& M<br>CANCEL=R &WORD2& S |

② SUBSTITUTE VALUE OF WORDn OF MESSAGE FOR &WORDn& OF
SETTING INFORMATION

CORRESPONDENCE INFORMATION

MSG = WHEN YOU INITIALIZE AS VOLUME[AAA],PLEASE MOUNT THE
TAPE ON DEVICE[T01] AND PUSH OK BUTTON
PLEASE PUSH A CANCEL BUTTON, WHEN YOU DO NOT
INITIALIZE
BUTTON1=OK
BUTTON2=CANCEL
ORG_MSG=J123 57 JSF621D M VOLUME TO BE LABELED AAA ON T01  ~70

GENERATED COMMAND

| OK | R 57 M |
|---|---|
| CANCEL | R 57 S |

71

OS ORIGINAL FORMAT MESSAGE     ③ ORG_MSG IS SET AS TEXT40b

| IMPORTANCE A | J123 57 JSF621D M VOLUME TO BE LABELED AAA ON T01 | ~40

SYSTEM MANAGEMENT INFORMATION PROCESSING METHOD FOR USE WITH A PLURALITY OF OPERATING SYSTEMS HAVING DIFFERENT MESSAGE FORMATS

BACKGROUND OF THE INVENTION

1. Field of the Invention

The present invention relates to a system management information apparatus and a system management information method, and in particular, to a system management information apparatus and a system management information method in which a message issued from an operating system (OS) of an information processor is converted into a particular format and which generates correspondence information corresponding to the message and a command to be executed for the message.

2. Description of the Related Art

Heretofore, a computer system includes a console as an interface between an operator and the computer system. On the console is displayed a message indicating a status of the operating system. The message format varies depending on a type of the operating system.

JP-A-5-308415 describes technique in which an autonomous message sent from a telephone network switch B includes information such as urgency, day/time, a message identification, a message title, and detailed information in this order. The autonomous message from the switch is converted into an integrated message format including information such as a telephone exchange identification, year-month-day, time, day or the week, urgency, a message title, a message number, and detailed information in this order. On the other hand, a network system includes a network management system to manage network nodes constituting the network such as servers and routers. One of the products of the network management system is OpenView Network Node Manager (to be abbreviated as NNM herebelow) put to the market from the Hewlett-Packard, Palo Alto, Calif. U.S.A. (OpenView is a trademark of the Hewlett-Packard in U.S. and the other countries.) NNM monitors and manages statuses of network nodes according to RFC1157, Simple Network Management Protocol (SNMP). NNM acquires event information outputted from an operating system of a network node according to SNMP, converts the information into a message of a particular format, and then displays the converted message. According to HP Managing Your Network with HP Open View Network Node Manager, HP Part No. J1240-90035, the converted message format can be registered and the value of an event item can be specified in NNM.

SUMMARY OF THE INVENTION

In the method described in JP-A-5-308415 above, additional information items of a message such as an output time and urgency of the message are converted into a common format to thereby integrate the message display format.

In this connection, the operating system outputs, as a message, the additional information items such as an output time and urgency and text information items representing the contents of the message. The operator monitors the text information to conduct operation for the operating system. Additionally, even messages representing the same contents include different text information items depending on the operating systems.

In JP-A-5-308415, however, the integration of the text information for common or shared uses is not discussed. When the text information is not integrated, the operator must confirm the type of the pertinent operating system to monitor the contents of text information. This may cause erroneous recognition of the message contents. Moreover, such erroneous recognition of the message may also leads to a mistake in an operation of the operating system for the message.

In NNM, only an event conforming to SNMP can be converted into a message of a particular format. However, for a plurality of operating systems to convert messages into a common format, information outputted from an information processor not supporting SNMP must be converted into a message of a particular format.

To confirm the meaning of a message and contents or details of operation for the message, the operator refers to information on associated manuals and information displayed by a help function of the operating system or the like. Such a message includes variable information such as a job name and device name. The information of the manual and the information displayed by the help function includes an item for the information include an item indicating that the pertinent information is variable information. Therefore, the operator must compare the information of the manual and/or the help function with the message to determine the contents of the message, and then the operator inputs an appropriate command. This may cause erroneous recognition of the message and a wrong operation for the operating system.

It is therefore an object of the present invention to provide a technique in which text information of a message issued from an operating system of an information processor can be converted into a common format.

Another object of the present invention to provide a technique which can generate detailed contents of a message including variable message information such as a job name and a device name and which can generate correspondence information for the message.

Still another object of the present invention to provide a technique which can generate a command to be executed for the message.

According to the present invention, a console for managing a plurality of computers on which operating systems (OS) operate and the operating systems output messages of mutually different types and have mutually different command systems executes processing as follows.

The console acquires, from the computers, a plurality of messages outputted from the operating systems operating on the respective computers, converts the messages, received from the computers, into messages of a common format, and displays, on the display, each of the messages converted into the common format. More concretely, the storage of the console a file containing, for each of the messages outputted from the operating systems, a definition of a selection condition including a character string as part of the message and a message in a common format corresponding to the selection condition. The file is referred to and the message acquired from the computers are converted into messages in a common format.

Moreover, according to the present invention, for each of the messages acquired from the computers, correspondence information is displayed on the display and a command which is unique to an operating system having outputted the message and which executes the correspondence information is generated. The command is transmitted to the operating system having outputted the message. More specifically, for each of the messages outputted from the operating systems, the storage stores a file storing therein a definition including a selection condition including a character string as part of the message and a message representing correspondence information for the pertinent message. The file is referred to and the message representing correspondence information for the message acquired from the computers is displayed.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Description will be given of a first embodiment of the present invention by referring to FIGS. 1 to 9.

Figure 1:
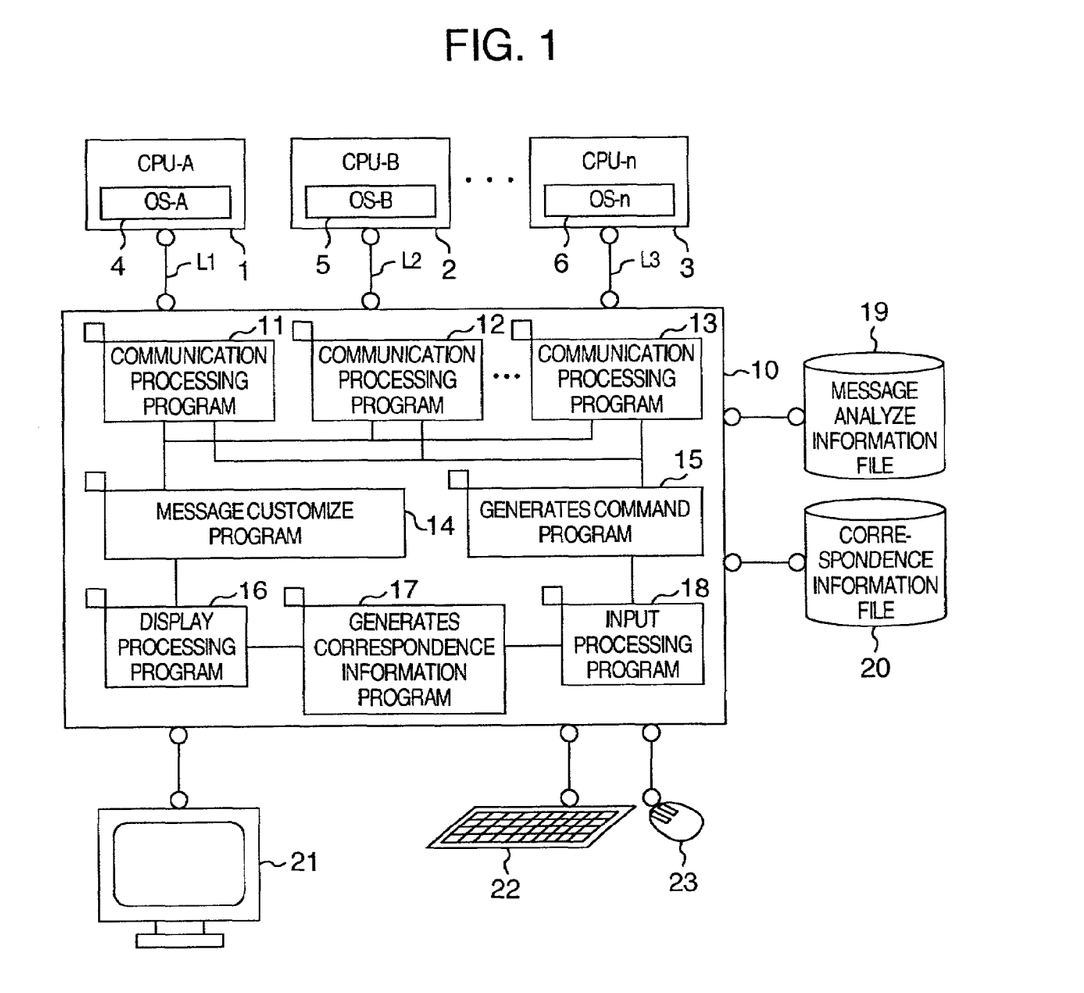
FIG. 1 is a diagram showing a configuration example of a computer system according to the present invention.

FIG. 1 shows constitution of a computer system employing a system management information processing method according to the present invention. In FIG. 1, reference numerals 1 to 3 indicates central processing units (CPU) of the computer system, specifically, CPU-A, CPU-B, and CPU-n. In the CPUs 1 to 3, operating systems 4 to 6 are respectively operating and are indicated as OS-A, OS-B, and S-C, respectively. The operating systems 4 to 6 may be of the same type or may differ from each other. The central processor units are not limited in number.

Although not shown in FIG. 1, each of the central processing units 1 to 3 includes a service processor (SVP). The service processor is a logic control circuit for the central processing unit and the console. JP-A-57-81655 describes a service processor. The service processor is connected via lines L1, L2, and L3 to a controller 10.

The lines L1, L2, and L3 may be of any types. That is, these lines may be dedicated lines or may include a local area network (LAN) such as Ethernet and/or a public switched telephone network.

The controller 10 is implemented by a computer which can execute data processing such as a personal computer or a workstation. Although not shown, the controller 10 includes a CPU and a memory. It is only necessary that the controller 10 can operate such operating systems, for example, of UNIX (a trademark exclusively licensed for the X/Open Company Limited in the U.S. and the other countries) and Windows (Windows (R) is a trademark of the Microsoft in the U.S. and the other countries) of the Microsoft. Operating systems are not shown in FIG. 1.

The controller 10 is connected to a storage keeping therein a message analyze (analysis) information file 19 and a correspondence information file 20, a keyboard 22, and a mouse 23. The file 19 stores information to convert a message outputted from an operating system running on the central processing unit. The file 20 stores information to generate correspondence information for the message and a command executable for the message. The files 19 and 20 may be kept in physically different storages or in one storage. The console of the present embodiment includes a storage keeping the message analysis information file 19 and the correspondence information file 20, a display 21, a keyboard 22, and a mouse 23.

In the controller 10, the following programs operate to achieve the system management information processing method of the present invention.

(1) Message customize (customization) program 14
(2) Command generation program 15
(3) Correspondence information generation program 17

Like ordinary programs, these programs are executed by the CPU and the memory.

Additionally, in the controller 10, communication processing programs 11 to 13 operates to communicate messages and commands via the lines L1 to L3 with the operating systems 4 to 6, respectively. The communication processing programs 11 to 13 correspond to the operating systems 4 to 6, respectively.

The message customization program 14 refers to the message analysis information file 19 to convert messages received by the communication processing programs 11 to 13.

The correspondence information generation program 17 refers to the correspondence information file 20 to generate correspondence information for the messages.

The command generation program 15 refers to the correspondence information file 20 to generate commands executable for the messages.

The display processing program displays the following information on the display 21.

(1) Message converted by message customization program 14
(2) Correspondence information generated by correspondence information generation program 17

When the converted message is displayed on the display 21, a message in a format unique to the operating system may also be displayed. As a result, the operator can confirm an original message outputted from the operating system.

The input processing program 18 acquires input information from the keyboard 22 and the mouse 23. According to the contents of the acquired input information, the program 18 sends an indication of execution to the correspondence information generation program 17 and the command generation program.

Details of the programs will be described later.

Figure 2:
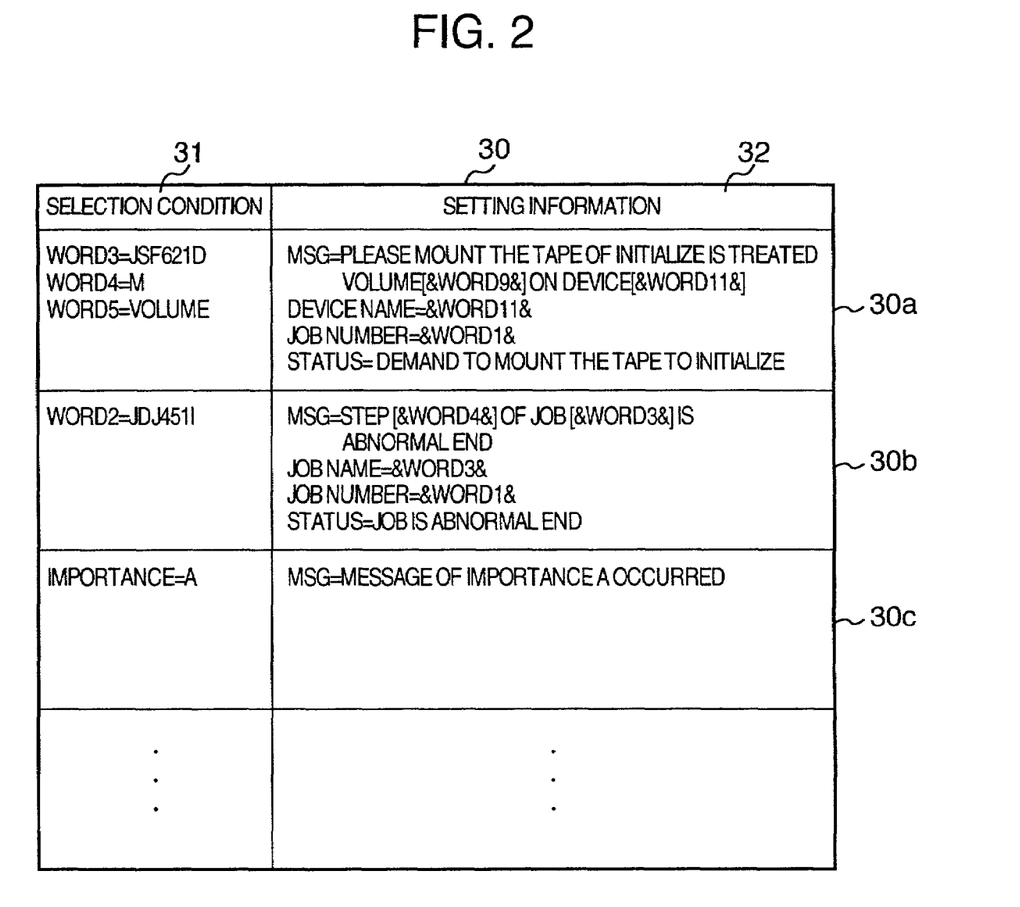
FIG. 2 is a table showing a record format example of message analysis information records stored in a message analysis information file.

FIG. 2 shows an example of a record format of message analysis information records 30 stored in the message analysis information file 19.

A message analysis information record 30 includes information items as follows.

(1) Selection condition 31 to select a message as an object of the record
(2) Setting information 32 as information to convert the message For the selection condition, a position and a value of each word constituting the message and importance of the message are defined. The position and the value of a word are defined in a format of "WORDn=Value of WORD". The message importance is defined in a format of "Importance=Importance of message". The record 30a defines to select a message satisfying a condition that the third word of the message is "JSF621D", the fourth word is "M", and the fifth word is "volume". The record 30b defines to select a message satisfying a condition that the second word of the message is "JDJ451I". The record 30c defines to select a message satisfying a condition that the importance of the message is "A". It is possible to define a plurality of message analysis information records 30.

The setting information 32 is disposed to define a format and attribute information of the message after conversion. The message format is specified as "MSG=message format" and the attribute information is specified as "attribute information name =attribute value". According to the record 30a, the format of the converted message is "please mount the tape to initialize is treated volume "&WORD9& on device "&WORD11&"". Ordinarily, the messages outputted from the operating system are written in English. However, the messages after the conversion may be in Japanese, English, German, Spanish, Korean, Chinese, or the like. The attribute information is defined as "&WORD11&" for "device name", "&WORD9&" for "job number", and "demand to mount the tape to initialize" for "status". In the setting information 31, "&WORDn&" indicates substitution of the value of the n-th word of the message to be converted. For example, the value of 11th word is substituted for the device name of the attribute information of the record 30a.

Figure 3:
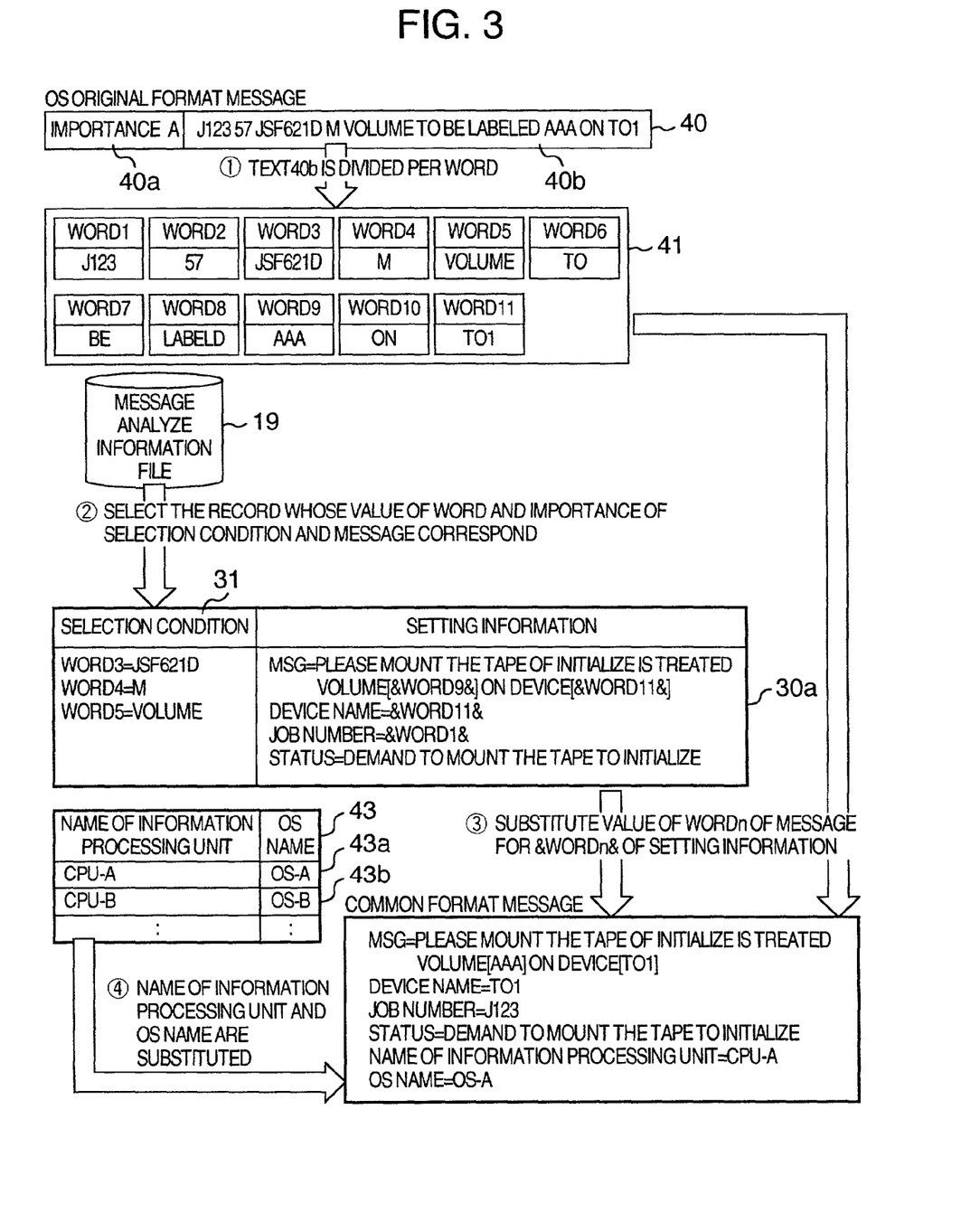
FIG. 3 is a diagram showing an example of a procedure to customize an operating system message.

FIG. 3 shows an example of a message conversion procedure conducted by the message customization program 14.

The program 14 divides text information 40b of a message 40 which is in a format unique to the operating system and which is received from the communication processing program 11, 12, or 13 into word units or per word to generate message information 41 including the divided words.

Next, the message customization program 14 accesses the message analysis information file 19 to obtain therefrom a message analysis information record 60 satisfying the following condition.

(1) The value of the word specified by the selection condition 31 matches or corresponds to that of the word of the message information 41 obtained by dividing the message in word units.

(2) Importance specified by the selection condition matches importance of the obtained message.

FIG. 3 shows selection of a record 30a for which word3, word4, and word5 have values, "JSF621D", "M", and "VOLUME", respectively.

Subsequently, the message customization program 14 substitutes the value of WORDn of the message information 41 obtained by dividing the message for &WORDn& of the setting information of the selected message analysis information record 30a to thereby generate a common format message 42. In FIG. 3, the values "T01" and "AAA" respectively of WORD1 and WORD9 of the message information 41 are substituted respectively for &WORD11& and &WORD9& specified by MSG of the setting information. The value "T01" of WORD11 of the message information 41 is substituted for &WORD11& specified by "device name" of the attribute information. Similarly, "J123" is substituted for "job number" of the attribute information.

Next, the message customization program 14 refers to an identification information table 43 storing information to identify an output source of a message and sets a name of an information processor or an information processing unit and an operating system name to a common formation message. In FIG. 3, information of a table 43a is set to the message.

Figure 4:
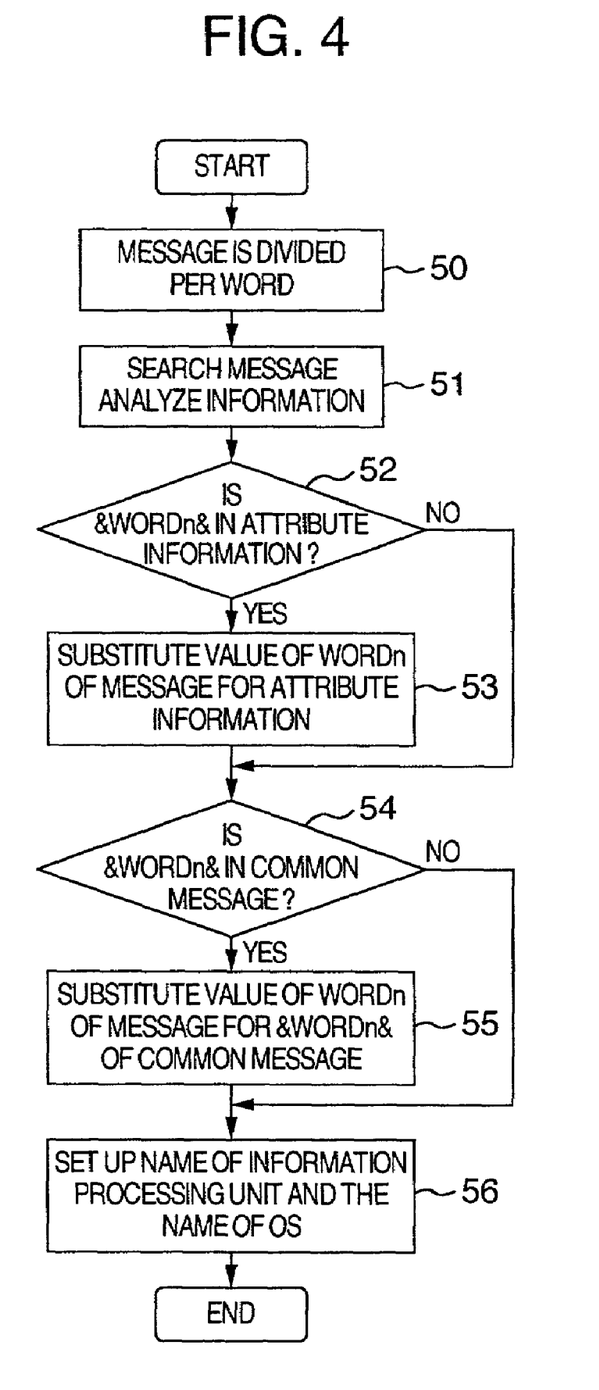
FIG. 4 is a flowchart showing a processing flow of a message customizing program.

FIG. 4 shows a processing flow of the message customization program 14.

The program 14 divides a message obtained from the communication program 11, 12, or 13 into word units (step 50).

Next, the program 14 searches the message analysis information file 19 for a message analysis information record 30 satisfying a condition described in conjunction with FIG. 3 (step 51).

The program 14 then determines whether or not attribute information with a value of &WORDn& is defined in the setting information 32 of the obtained record 30 (step 52).

If it is determined as a result of step 52 that the attribution information is defined, the value of WORDn of the message information 41 is substituted for a field of the attribute definition (step 53).

If it is determined as a result of step 52 that the attribution information is not defined or if step 53 is finished, the program 14 determines whether or not &WORDn& is contained in the contents of MSG of the setting information of the message analysis information record 30 (step 54).

If it is determined as a result of step 53 that the &WORDn& is not contained, step 56 is executed.

If it is determined as a result of step 53 that the &WORDn& is contained, the value of WORDn of the message information 41 is substituted for a field of &WORDn& (step 55) and then step 56 is executed.

Finally, the message customization program 14 obtain an operation system name of an information processor having issued the message and sets the information processor name and the operation system name to the common format message 42 (step 56).

The message 42 converted or generated by the message conversion processing is displayed by the display processing program 16 on the display 21.

A display indication of the correspondence information is inputted from the keyboard 22 or mouse 23 for the displayed common format message 42. The input processing program 18 obtains the display indication and sends a generation indication of the correspondence information to the correspondence information generation program 17.

Figure 5:
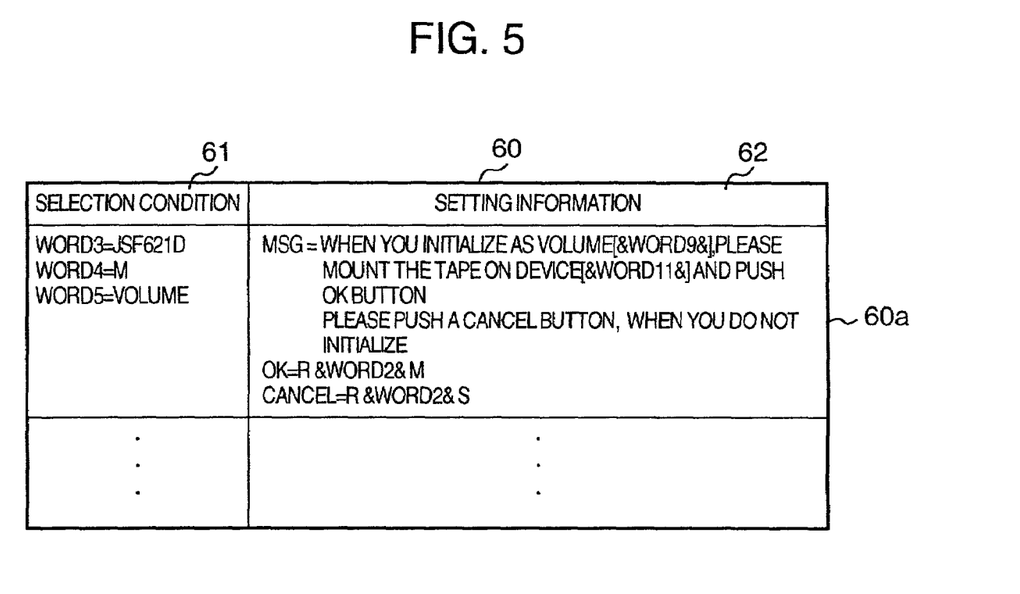
FIG. 5 is a table showing a record format example of correspondence information records stored in a correspondence information file.

FIG. 5 shows an example of a correspondence information record 60 stored in the correspondence information file 20. According to the contents of the record 60, the correspondence information generation program 17 generates correspondence information.

A correspondence information record 60 includes items as follows.

(1) Selection condition 61 to identify a message associated with the record (2) Setting information 62 in which information generated as correspondence information is stored In the selection condition 61 of the correspondence information record, a position and a value of a word constituting the message are defined in the format of "WORDn=value of WORD". The definition of the record 60a indicates to select a message of which the fourth word is "M" and the fifth word is "VOLUME". A plurality of correspondence information records can be defined.

In the setting information 62, a message format and button information are defined to display a message as correspondence information on the display 21. The button information defines a format of a command which is referred to by the command generation program 15. The message format is specified as "MSG=command format" and the button information and the command format are specified as "button name=command format". In the record 60a, the message format is "when you initialize as volume [&WORD9&], please mount the tape on device [&WORD11&] and push OK button. Please push a CANCEL button when you do not initialize." For the button information, "OK" and "CANCEL" are defined and the respective command formats are [R &WORD2& M] and [R &WORD3& S]. It is indicated that a value of the n-th word of the message to generate correspondence information is substituted for &WORDn& contained in the setting information. For example, the value of the second word is substituted for &WORD2& contained in OK of the command format of the record 60a.

Figure 6:
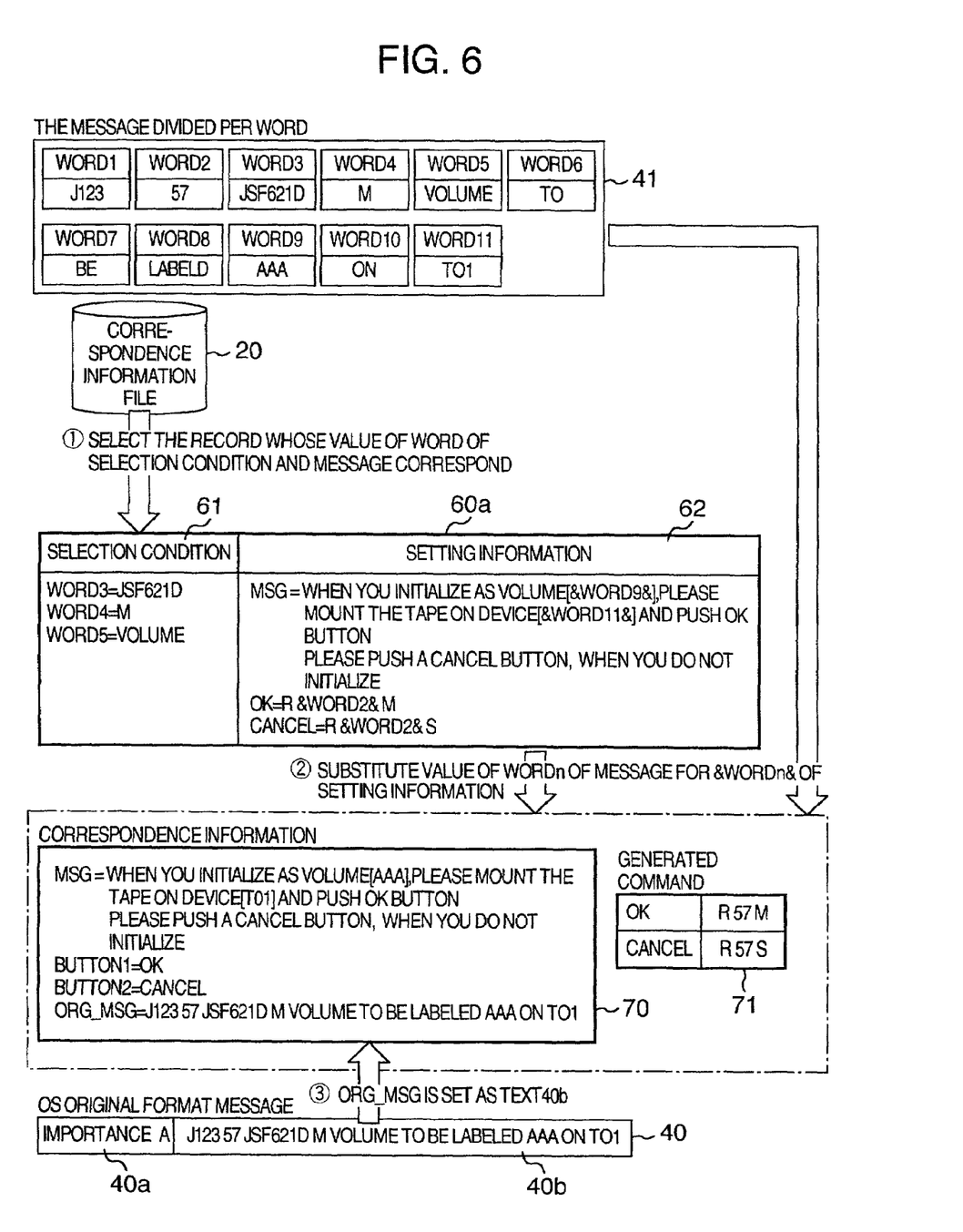
FIG. 6 is a diagram showing an example of a procedure to generate correspondence information and a command.

Referring now to FIG. 6, description will be given of a procedure to generate correspondence information and a command.

FIG. 6 shows a processing procedure to generate correspondence information and a command by the correspondence information generation program and the command generation program 15.

The correspondence information generation program 17 selects a correspondence information record 60 from the correspondence information file 20 to generate correspondence information. For the selected record 60, the message information 41 obtained by division in word units corresponds to values of the words of the selection condition 61. Selected in FIG. 6 is a record 60a in which the values of WORD3, WORD4, and WORD5 are respectively "JSF621D", "M", and "VOLUME".

A value of WORDn of the divided message information 41 is substituted for &WORDn& of the setting information 62 of the selected correspondence information record 60a. In this processing, there is produced a message [MSG=. . . ] of correspondence information 70. In FIG. 6, the values "AAA" and "T01" respectively of WORD9 and WORD11 of the divided message information 41 are substituted for &WORD9& and &WORD11& specified by MSG of the setting information 62.

According to the button information defined in the setting information 62, a definition "buttons "OK" and "CANCEL" are to be displayed" is set to the correspondence information 70 (button 1=OK and button 2=CANCEL).

Subsequently, text information 40b of the message 40 in the format unique to the operating system is set as ORG_MSG to the correspondence information 70. This completes the generation of the correspondence information 70.

The command generation program 15 generates a command in a command format of the setting information of the correspondence information record 60 selected by the correspondence information generation program 17. The command generation program 15 generates a generated command by substituting the value of WORDn of the divided message 41 for &WORDn& contained in the command format of the setting information 62. In FIG. 6, "R 57 M" is generated for "OK" and "R 57 S" is generated for "CANCEL".

Figure 7:
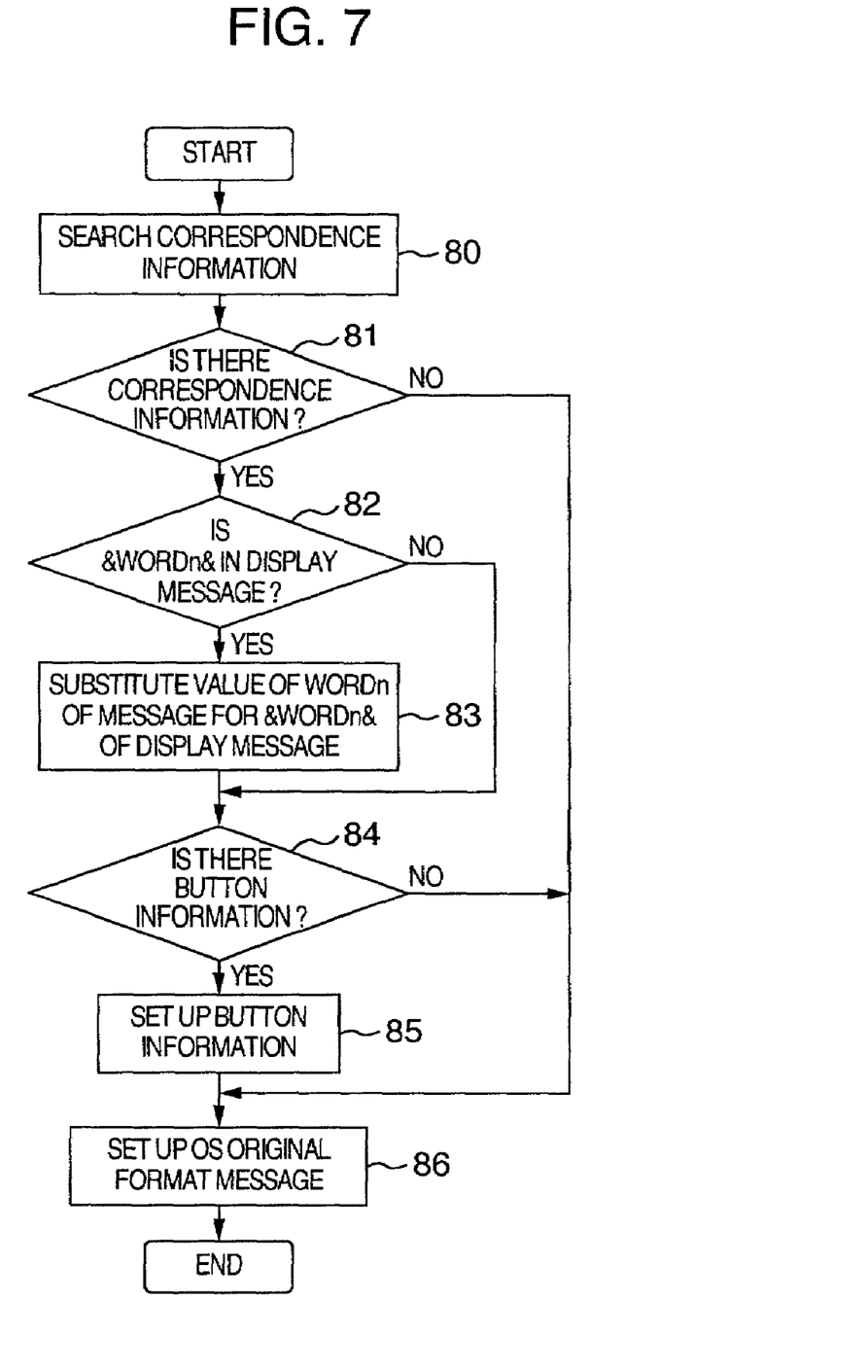
FIG. 7 is a flowchart showing a procedure example of a correspondence information generation program.

FIG. 7 shows a processing flow of the correspondence information generation program 17 in a flowchart. The program 17 starts the processing when an indication of correspondence information generation from the input processing program 18.

The program 17 searches for a correspondence information record 60 to generate correspondence information (step 80). In the record 60 to be selected, the divided message information 41 corresponds to values of words of the selection condition 61.

Next, the program 17 determines whether or not the correspondence information record 60 is obtained (step 81). If it is found as a result of step 81 that the record 60 cannot be obtained, the program 17 executes step 86.

If it is found as a result of step 81 that the record 60 can be obtained, the program 17 determines whether or not &WORDn& is contained in the display message of the setting information 62 (step 82).

If it is found as a result of step 82 that &WORDn& is contained in the display message of the setting information 62, the program 17 substitutes a value of WORDn of the divided message 41 for a field of &WORDn& (step 83). If it is found as a result of step 82 that &WORDn& is not contained in the display message of the setting information 62 or if step 83 is finished, the program 17 executes step 84.

In step 84, the program 17 determines whether or not button information present or absent in the setting information 62. If it is found as a result of step 84 that the button information is absent, the processing is terminated. If the button is present as a result of step 84, the button information is set to the correspondence information 70 (step 85).

Finally, the text information 40b of the message 40 in the operating system original format to the correspondence information 70 in step 86.

Figure 8:
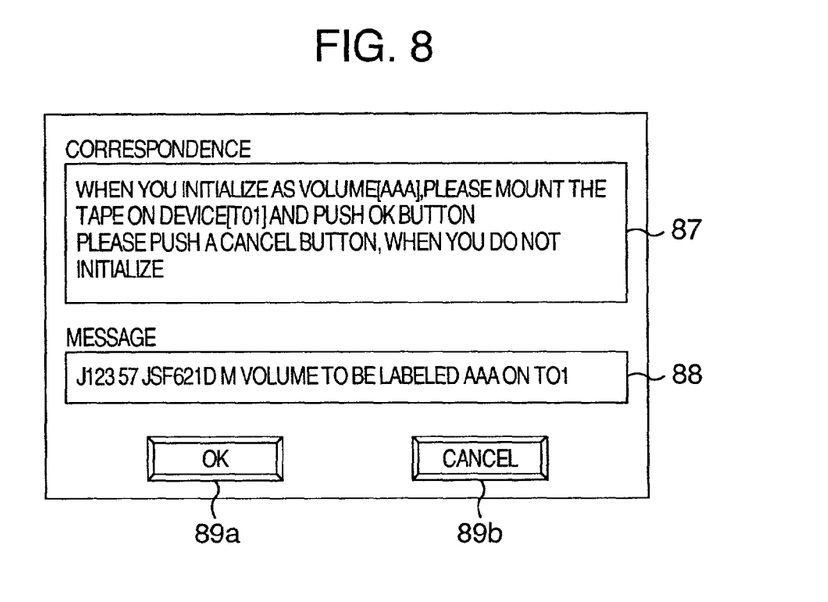
FIG. 8 is a diagram showing an example of a display format of correspondence information.

As a result of the processing, the display processing program 16 displays the generated correspondence information 70 on the display 21. FIG. 8 shows a display example of the correspondence information 70.

FIG. 8 shows an example of display of the correspondence information 70. The display message is displayed in the correspondence information display area 87. The text information 40b of the message 40 in the operating system original format is displayed in a message display area 88. "OK" and "CANCEL" are displayed as buttons 89a and 89b, respectively.

When the button 89a or 89b is pushed, the input processing program 18 sends to the command generation program 15 information of the selected button as a command generation indication. According to the command generation indication, the program 15 generates a command.

Figure 9:
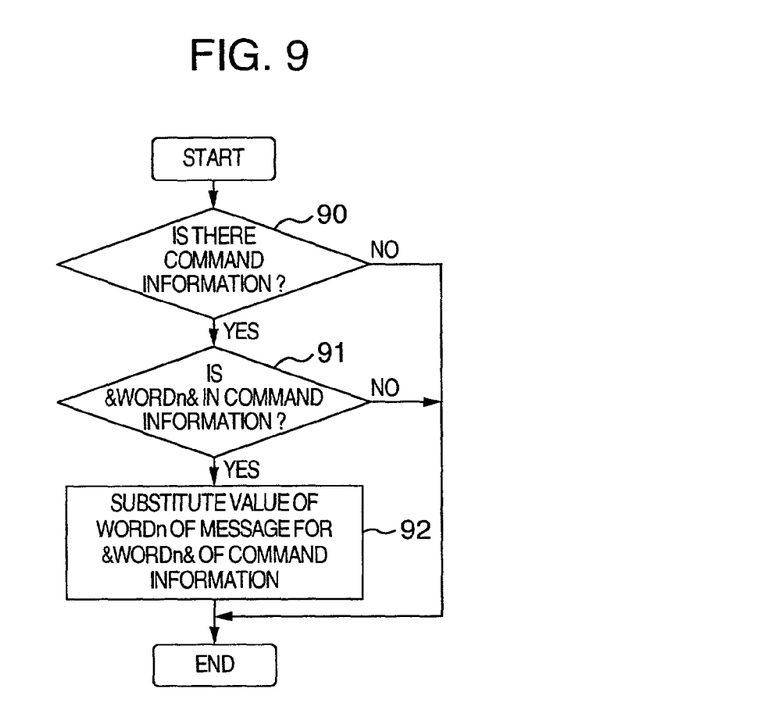
FIG. 9 is a flowchart showing processing of a command generation program.

FIG. 9 shows a processing flows of the command generation program 15.

The program 15 determines whether or not a command format corresponding to the button is defined in the setting information 62 of the correspondence information record 60 (step 90). The record 60 used by the program 15 is a record retrieved by the correspondence information generation program 17.

If it is found as a result of step 90 that the command format is not defined, the processing is terminated. If it is found as a result of step 90 that the command format is defined, the program 15 determines whether or not the command format contains &WORDn& (step 91).

If it is found as a result of step 91 that the command format does not contain &WORDn&, the command format is set to a generated command 71 and then the processing is terminated. If it is found as a result of step 91 that the command format contains &WORDn&, a value of WORDn of the divided message 41 is substituted for a field of &WORDn& to obtain a generated command 71 (step 92).

The command 71 thus generated through the processing is sent, to the operating system having issued the message, by the communication processing program 11, 12, or 13.

To install the image customization program 14, the command generation program 15, and the correspondence information generation program 17 in the controller 10, it is only necessary to use a computer-readable information recording medium such as a compact disk read-only memory (CD-ROM) having stored thereon these programs.

The computer-readable information recording medium has the following aspects.

(1) On the computer-readable recording medium, there is recorded a program for controlling a console for managing a plurality of computers on which operating systems (OS) operate, the operating systems outputting messages of mutually different types and having mutually different command systems, the console including a storage and a display. The program includes the steps of converting messages acquired from the computers into messages of a common format and displays, on the display, each of the messages converted into the common format.

(2) On the computer-readable recording medium, there is recorded a program for controlling the console described in (1) above. The program includes the step of displaying, when displaying each of the messages converted into the common format on the display, also a message before conversion of the pertinent message on the display.

(3) On the computer-readable recording medium, there is recorded a program for controlling the console described in (1) above. The program includes the step of displaying, on the display, each of the messages converted into the common format in Japanese.

(4) On the computer-readable recording medium, there is recorded a program for controlling the console described in (1) above. The program includes the step of displaying, when displaying each of the messages converted into the common format on the display, also a computer having outputted the message.

(5) On the computer-readable recording medium, there is recorded a program for controlling the console described in (1) above. The program includes the steps of referring to a file stored in the storage, the file containing, for each of the messages outputted from the operating systems, a definition of a selection condition including a character string as part of the message and a message in a common format corresponding to the selection condition, and converting, when the message acquired from the computers contains a character string matching with the selection condition, the message into a message in a common format corresponding to the selection condition matching with the character string.

(6) On the computer-readable recording medium, there is recorded a program for controlling the console described in (5) above. The program includes the steps of substituting a character string, as part of the message acquired from the computers, for an item of the common-format message corresponding to the selection condition matching with the character string and displaying on the display the message for which the item of the character string is substituted.

(7) On the computer-readable recording medium, there is recorded a program for controlling the console described in (5) above. The program refers to the file which contains, for each of the messages outputted from the operating systems, a definition of a selection condition including a character string as part of the message, positional information of the character string in the message, and a message in a common format corresponding to the selection condition.

(8) On the computer-readable recording medium, there is recorded a program for controlling the console described in (1) above. The program includes the step of displaying, for each of the messages acquired from the computers, correspondence information on the display and generating a command unique to an operating system having outputted the message, the command executing the correspondence information, and transmitting the command to the operating system having outputted the message.

(9) On the computer-readable recording medium, there is recorded a program for controlling the console described in (8) above. The program includes the step of referring to a first file stored in the storage, the first file storing therein, for each of the messages outputted from the operating systems, a definition including a first selection condition including a character string as part of the message and a message in a common format corresponding to the selection condition, converting, when the message acquired from the computers contains a character string matching with the first selection condition, the message into a message in a common format corresponding to the first selection condition matching with the character string, referring to a second file stored in the storage, the second file storing therein, for each of the messages outputted from the operating systems, a definition including a second selection condition including a character string as part of the message and a message corresponding to the second selection condition and representing correspondence information for the message, displaying, when the message acquired from the computers contains a character string matching with the second selection condition, the message corresponding to the second selection condition and representing correspondence information for the message on the display.

According to the embodiments, the text information of messages outputted from the operating systems can be converted into a particular format. For example, when the types of the operating systems of the computer systems are mutually different from each other, the messages from the operating systems can be converted into a common format. Additionally, for a message from an operating system, correspondence information can be generated to be displayed according to the embodiments. Moreover, for a message from an operating system, an operation command for the message can be automatically generated to be transmitted to the operating system. This resultantly facilitates the management and operation of many types of operating systems. Therefore, possibility of erroneous operations of the operators is minimized and the system operation can be achieved with high reliability.

According to the embodiments, a plurality of computer systems can be managed with a reduced number of operators. This consequently minimizes the system operation cost.

Furthermore, according to the embodiments, by describing the data of the setting information items 32 and 62 in a desired language selected from many available languages, the messages can be presented in the desired language. Therefore, the format of operating system messages can be altered without changing the specification of the operating system. That is, the messages can be notified in various languages.

Next, a second embodiment of the present invention will be described.

Figure 10:
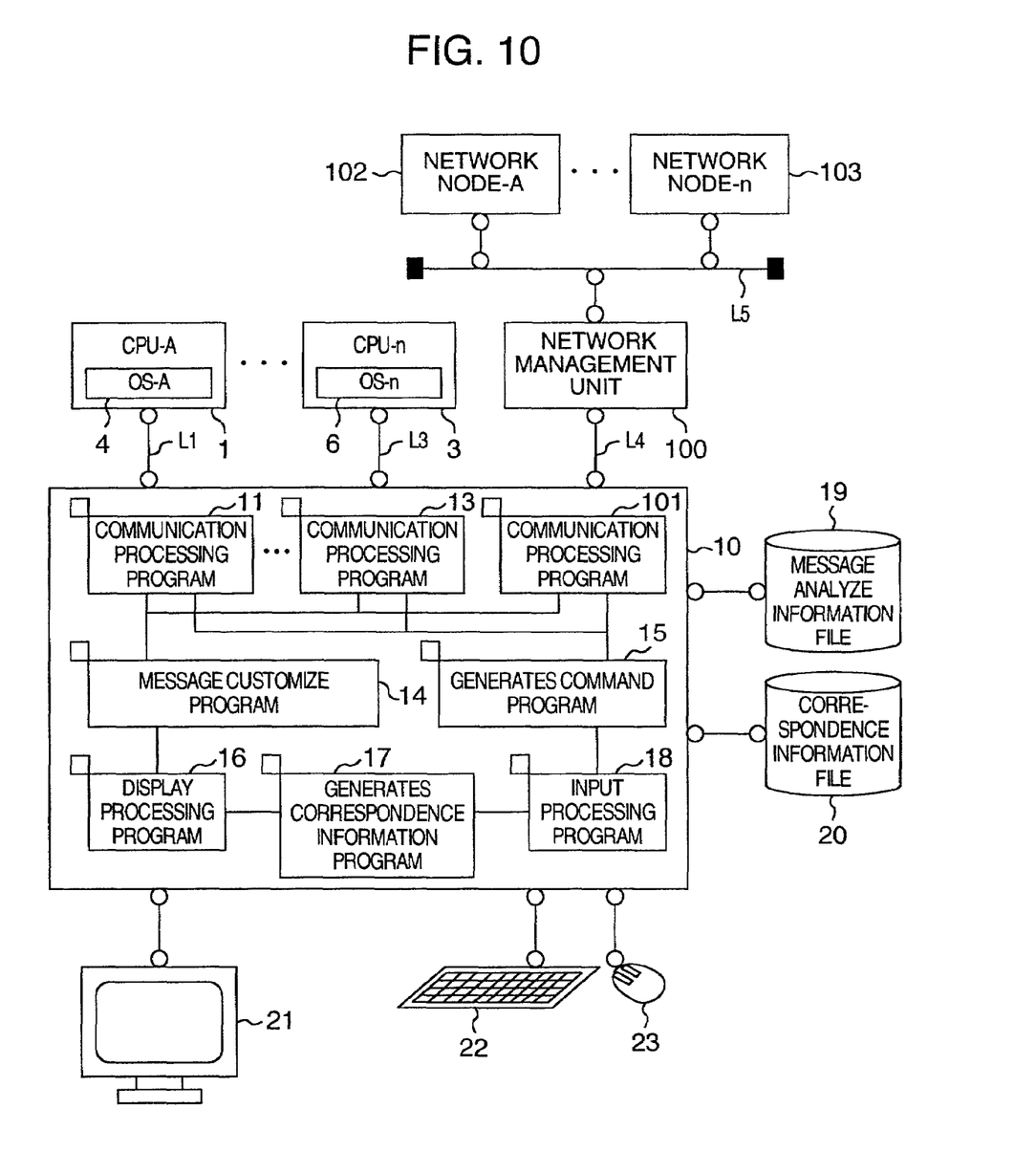
FIG. 10 is a diagram showing another configuration example of a computer system according to the present invention.

FIG. 10 shows a configuration example of a computer system and a network management system employing a system management information processing method in a second embodiment of the present invention. In FIG. 10, the same constituent elements and programs as those of FIG. 1 are assigned with the same reference numerals.

The second embodiment differs from the first embodiment in that the controller 10 is connected to a network management unit 100. The unit 100 manages network nodes 102 and 103 constituting the network.

A message customization program 14, a-command generation program 15, and a correspondence information generation program 17 operates in the same way as for those of the first embodiment to convert messages from the network management unit 100 into a common format.

According to the embodiments, the overall information processing system including the network nodes can be comprehensively managed.

In accordance with the present invention, the messages outputted from the operating systems of the information processors can be converted into a particular format. Furthermore, according to the present invention, for a message from an operating system, correspondence information can be generated to be displayed, and an operation command for the message can be automatically generated to be transmitted to the operating system.

Moreover, in accordance with the present invention, since the format of operating system messages can be altered without changing the specification of the operating system, the messages can be easily presented in various languages.

The specification and drawings are, accordingly, to be regarded in an illustrative rather than a restrictive sense. it will, however, be evident that various modifications and changes may be made thereto without departing from the broader spirit and scope of the invention as set forth in the claims.

What is claimed is:

1. A system management information processing method for use with a plurality of operating systems, which output messages of mutually different types and have mutually different command systems, each of the operating systems can access a storage and a display, comprising the steps of:
acquiring at least one original message outputted from said operating systems;
dividing each of said original message into respective word units;
referring to a file stored in said storage thereby corresponding a record in the file to one of said original message by matching a set of selection conditions contained therein, each of said selection conditions containing
a definition of a respective selection condition including a character string as part of said one of the original message, and
positional information indicating a relative position of said character string in said word units; and
converting, said word units into a common format message corresponding to said selection conditions.

2. A system management information processing method for use with a plurality of operating systems, which output messages of mutually different types and have mutually different command systems, each of the operating systems can access a storage and a display, comprising the steps of:
acquiring at least one original message outputted from said operating systems; dividing each of said original message into respective word units;
referring to a file stored in said storage thereby corresponding a record in the file to one of said original message by matching a set of selection conditions contained therein, each of said selection conditions containing
a definition of a respective selection condition including a character string as part of said each of the original message, and
positional information indicating a relative position of said character string in said word units;
converting said word units into respective correspondence information corresponding to said selection conditions; and
relating said original message outputted from said operating systems to said correspondence information.

3. A system management information processing method for use with a plurality of operating systems, which output messages of mutually different types and have mutually different command systems, each of the operating systems can access a storage and a display, comprising the steps of:
dividing an original message outputted from said operating systems into respective word units;
referring to a first file stored in said storage thereby corresponding a first record in the first file to said original message by matching a set of first selection conditions contained therein, each of said first selection conditions containing a definition including a respective first selection condition including a first character string as part of said original message and positional information indicating a relative position of said first character string in said word units, and the first file containing a message in a common format corresponding to the first selection condition;
converting, when said original message contains said first character string matching with said first selection conditions, said word units into said message in a common format
referring to a second file stored in said storage thereby corresponding a second record in the second file to said original message by matching a set of second selection conditions contained therein, each of said second selection conditions containing a definition including a respective second selection condition including a second character string as part of said original message and positional information indicating a relative position of said second character string in said word units, and the second file containing a message corresponding to the second selection conditions and representing correspondence information for said original message; and
concerting, when said original message contains said second character string matching with said second selection conditions, said word units into respective correspondence information corresponding to said second selection conditions.

4. A system management information processing method according to claim 3, wherein said first selection condition is substantially equal to said second selection condition.

5. A system management information processing method according to claim 2, wherein one of the selection conditions includes information indicating importance of said original messages.

6. A system management information processing method according to claim 3, further comprising the step of displaying, when said original message contains said first character string matching with said first selection conditions, said message in a common format on the display.

7. A system management information processing method according to claim 3, further comprising the step of:

displaying, when said original message contains said second character string matching with the second selection conditions said message corresponding to the second selection conditions and representing said correspondence information for the message on the display.

8. A system management information processing method according to claim 1, further comprising the step of displaying a message information derived from said common format message on said display.

9. A system management information processing method according to claim 8, wherein said common format message is displayed in Japanese or other language designated by a user.

10. A system management information processing method according to claim 8, wherein one of the selection conditions includes information indicating importance of said original message.

11. A system management information processing method according to claim 2, further comprising the steps of generating a command for a designated operating system to be executed as set in said correspondence information; and transmitting said command to said designated operating system for execution.

12. A system management information processing method according to claim 2, further comprising the step of displaying a message derived from said correspondence information on said display.

13. A system management information processing method according to claim 12, wherein said message information is displayed in Japanese or other language designated by a user.

* * * * *